E. INGER.
Sad-Iron Holder.

No. 97,641. Patented Dec. 7, 1869.

United States Patent Office.

EGMONT INGER, OF NEW YORK, N. Y.

Letters Patent No. 97,641, dated December 7, 1869.

---

IMPROVED SAD-IRON HOLDER.

---

The Schedule referred to in these Letters Patent and making part of the same.

---

*To all whom it may concern:*

Be it known that I, EGMONT INGER, of the city, county, and State of New York, have invented a new and improved Handle-Protector for Sad-Irons; and I do hereby declare the following to be a full, clear, and exact description thereof, which will enable those skilled in the art to make and use the same, reference being had to the accompanying drawing, forming part of this specification, in which drawing—

Similar letters indicate corresponding parts.

Figure 1:
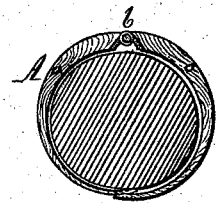
Figure 1 represents a transverse section of this invention.
Figure 2:
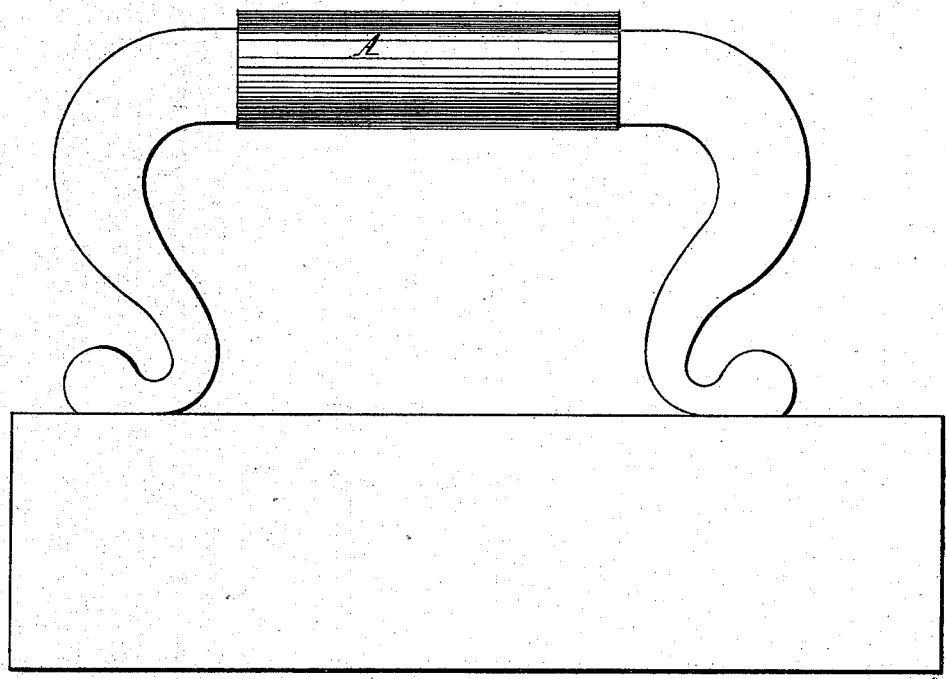
Figure 2 is a side elevation of the same.

This invention relates to a handle-protector for sad-irons, which is composed of two hinged jaws, which taper down toward their loose ends to a sharp edge, or nearly so, thereby enabling said loose ends to overlap each other, and allowing the protector to accommodate itself to handles of different size or thickness.

In the drawing—

The letter A designates my handle-protector, which is made of wood, or any other bad conductor of heat, and which is composed of two jaws, *a*.

These jaws are tapering, as shown in fig. 1 of the drawing, and they are connected at their ends by a hinge joint, *b*, so that they can be opened and closed. The loose thin ends of said jaws taper down to a sharp edge, or nearly so, and they are so formed that they are capable of overlapping each other, as shown.

By this arrangement of the jaws *a*, my protector is capable of adapting itself to handles of different sizes without leaving any part of the said handle exposed, and it takes a firm hold of every handle to which it may be applied.

If the handle is small or thin, the loose ends of the jaws overlap until the protector is brought up firmly against the surface of the handle, and if the handle is thick, the jaws spread open sufficiently far to make room for said handle, while, when they close upon the handle, their loose ends still overlap a little, so as to prevent the fingers from coming in contact with any portion of the handle.

I am aware that handle-protectors for sad-irons have been made, which are composed of two hinged jaws, such, for instance, as that described in Letters Patent of Leon Londisky, June 2d, 1857; but the loose ends of these jaws bring up square against each other when the protector is closed, and they are, therefore, adapted only to one and the same size handles. If the handle is thinner than this standard size, the protector does not take firm hold of the same, so that in operating the sad-iron, said protector assumes a disagreeable sliding motion on the handle, and if the handle is thicker than the standard size, the jaws do not close, and a portion of the handle remains uncovered.

I do not claim, broadly, as my invention, a handle-protector composed of two hinged jaws, such being shown and described in the patent of L. Londisky; but

What I claim as new, and desire to secure by Letters Patent, is—

A handle-protector for sad-irons, composed of tapering jaws *a*, hinged at their thick ends, while their loose thin ends are capable of overlapping each other, as shown and described.

EGMONT INGER.

Witnesses:
W. HAUFF,
JOHN A. WIEDERSHEIM.